Jan. 10, 1939.  M. GAERTNER  2,143,373
LIQUIDPROOF SUBMERGED BEARING
Filed June 7, 1937  2 Sheets-Sheet 1

INVENTOR
Moritz Gaertner
BY
ATTORNEY

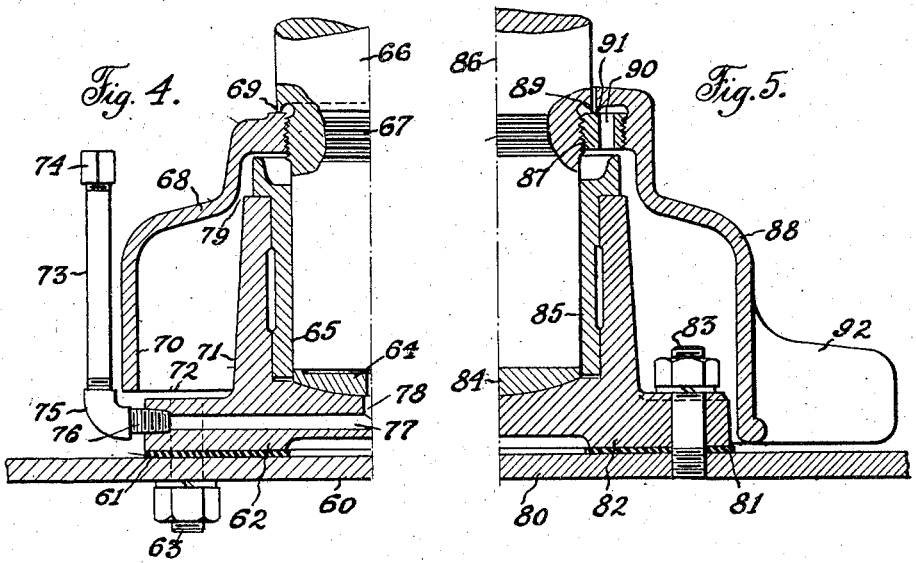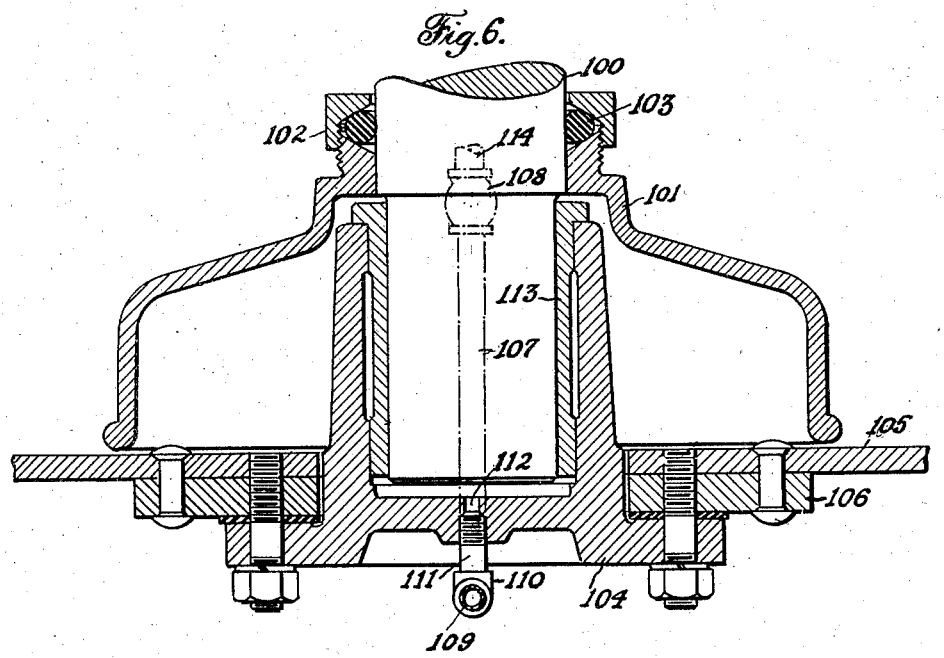

Patented Jan. 10, 1939

2,143,373

UNITED STATES PATENT OFFICE 2,143,373

LIQUIDPROOF SUBMERGED BEARING

Moritz Gaertner, New York, N. Y.

Application June 7, 1937, Serial No. 146,736

6 Claims. (Cl. 308—36.3)

The present invention relates to bearings, and, more particularly to bearings for agitators and other similar devices in which a rotatable shaft is supported in bearings submerged in a liquid.

Heretofore, great difficulties have been experienced in providing satisfactory bearings located at the bottom of a tank or reservoir for a vertical or approximately vertical shaft. As a matter of fact, when the liquid in which the bearing had to be operated contained great amounts of pulp and abrasive material, frequently no bottom bearing was used at all even when the shaft extended very far down into the tank. Of course, this type of structure was subjected to very considerable torsional and bending stresses and required a very high and heavy superstructure, an oversized shaft and oversized upper bearings. The oversized structural elements increased the friction and the power consumption and greatly increased the cost of installation and maintenance. It has been already suggested to provide watertight bearings submerged in the liquid including stuffing tubes and in some instances even compressed air was employed to keep out any liquid in case the stuffing box would not keep tight. These structures, however, were very expensive, inefficient and unreliable, and did not provide the art with a completely satisfactory liquid-submerged bearing.

I have discovered that the problem may be solved in a remarkably simple manner.

It is an object of the present invention to provide a liquid-proof submerged bearing which is free from the disadvantages of conventional bearings.

It is another object of the present invention to provide a bearing particularly adapted for agitators and similar applications requiring a bearing submerged in a liquid which is protected from all injurious substances contained in the liquid and which may be operated submerged in a liquid for any length of time.

It is a further object of the invention to provide a novel and improved liquid-submerged bearing which is capable of preventing the inflow of liquid into the bearing without employing a stuffing box.

The invention also contemplates an improved bearing for operation under the surface level of a liquid having means for lubricating the same even during operation of the bearing, if necessary, without necessitating removal of any part.

It is also within the contemplation of the invention to provide a novel and improved bearing for operation within a body of liquid, which may be inspected without taking out the shaft or any of the other parts of the driving mechanism.

Other and further objects and advantages of the present invention will become apparent from the following description taken in conjunction with the accompanying drawings; in which, Fig. 1 illustrates a vertical sectional view of a bearing embodying the principles of the present invention;

Fig. 4 is a fragmentary vertical sectional view of a modified embodiment of the invention including a lubricating device located within the tank or reservoir;

Fig. 5 is a similar view of a modification of the novel bearing in which the hood may be readily removed or lifted off; and Fig. 6 shows a vertical sectional view of a further modified embodiment of the invention in which a bell-shaped hood is clamped to the shaft proper and the bearing can be readily removed downwardly from the tank.

Broadly stated, according to the principles of my invention, I provide a bearing adapted to support the lower end of a rotatable shaft. The bearing may be of any type such as a thrust bearing or an annular ball or roller bearing, resting on a suitable seat. The entire structure is protected from the surrounding liquid by means of a sleeve. At the end of the shaft I airtightly mount a hood or bell-like member which together with the sleeve forms an annular air chamber or air trap having a very substantial width at the bottom and a greatly constricted cross section at the top thereof. The volume of the bell and the height of the sleeve are so selected that under the pressure of a liquid in which the bearing is submerged, the liquid will trap the air within the bell and will compress this air to such an extent only that the liquid will not overflow the top of the sleeve. This is generally readily accomplished in view of the strong constriction of the volume in the higher portions of the annular space between the bell-shaped hood and the sleeve. The air trapped in the annular chamber will positively prevent the liquid from entering the bearing itself and in fact will provide a gaseous packing between the bell-shaped hood and the sleeve.

Figure 1:
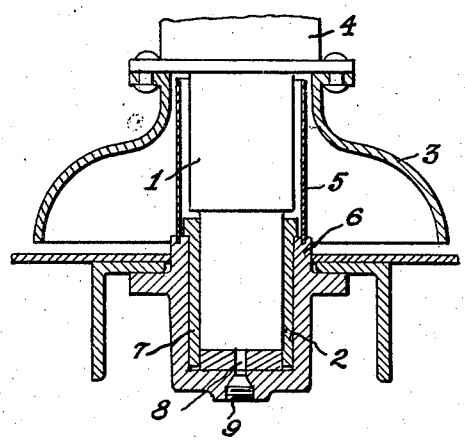
Figure 3:
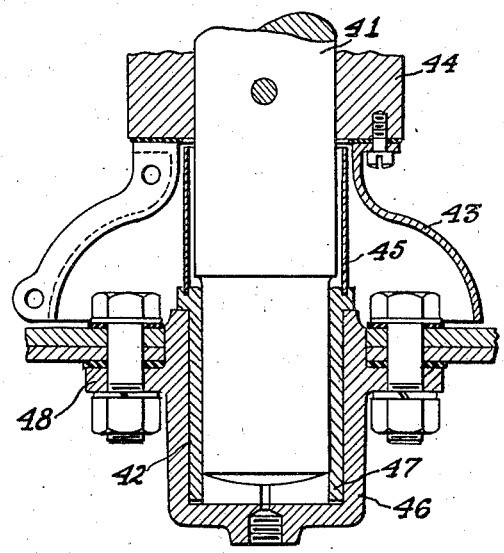
Fig. 3 shows a similar view of a further modified embodiment of the present invention.
Figure 2:
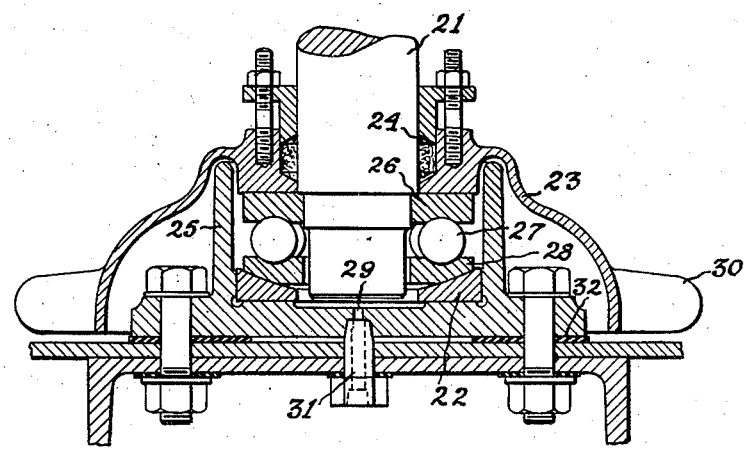
Fig. 2 depicts a vertical sectional view of a modified embodiment of the invention.

The invention will now be more fully described to those skilled in the art in connection with the accompanying drawings, in which Figs. 1 to 3 illustrate bearings particularly adapted for agitators as disclosed in my co-pending application Serial Number 758,552, now Patent No. 2,082,796 of which the present application is a continuation in part.

Referring now more particularly to Fig. 1, a preferred embodiment of my invention is illustrated. A vertical shaft 1 is supported by a thrust bearing 2. For the purpose of protecting the thrust bearing from the detrimental effects of the liquid in which the structure is submerged, a bell-shaped hood 3 is mounted on the hub 4 over the thrust bearing 2. A close and air-tight fit is essential between the hood and the hub so as to prevent the leaking of air out of the hood. A cylindrical sleeve 5 which is fastened to the bottom of the casing 6 encircles bearing lining 7 and prevents liquid from entering the bearing surface. A port 8 is also provided which permits the thrust bearing to be oiled under pressure and generally made accessible without necessitating emptying the casing. It is preferable to apply a grease cup of a pressure lubricating system to the outer threaded opening 9 of the port.

From the preceding description operation of my novel liquid-proof bearing will be readily understood by those skilled in the art. When the casing has been filled with liquid, the pressure at the bottom will tend to force the liquid up into the bell hood 3. However, there is sufficient volume within the hood to prevent the air from being compressed to such an extent that the liquid can rise up around the protecting sleeve 5 into the bearing. In this manner, I have avoided any chance of interference from the liquid.

In Figs. 2 and 3, I have shown vertical sectional views of step bearings including the preferred construction of the hood and protective ring. In the former, a ball thrust bearing is used in which the shaft 21 has its lower end stepped so as to seat on a bearing ring 26. Balls or rollers 27 carry the load to bearing ring 28 which rests on seat 22. Supporting the entire structure and protecting the same from the surrounding liquids is sleeve 25. On the end of the shaft so as to make the same air-tight is mounted a bell-shaped hood 23. In the drawings, a stuffing box 24 has been included to assure a tight fit so as to prevent liquid or air from passing therethrough and also for easy removal, if an inspection of the bearing is desired. It will be noted that this stuffing box is located between two surfaces which are stationary with respect to each other and thus will not wear out. In designing the bell, it is essential that the internal volume should be sufficiently large so that when the tank is filled with liquid, the pressure will not compress the air within the bell to such an extent as to cause the liquid to overflow at the top of the sleeve. For the purpose of maintaining the liquid as quiet as possible within the bell and thus avoid splashing, it is desirable to incorporate baffles or vanes (not shown) projecting outwardly from the sleeve.

Connecting the bottom of the bearing to the outer section of the casing a port 29 is provided for cleaning, draining and oiling purposes, having a pipe connection for a grease cup or lubricating tube and a valve or stopper 31 fitting in said port. A gasket 32 separates the rim of the bearing from the bottom of the casing and thus prevents the liquid from entering the port from below. On the outer periphery of the bell hood, I have provided a plurality of propeller vanes 30 which revolve and prevent dead spots from forming near the center of the casing. This is particularly important when the bearing is embodied into an agitator treating a circulating medium having a comparatively heavy solute which has a tendency to be deposited at the center near the bottom.

A further embodiment of the invention into a step bearing is depicted in Fig. 3 in which a shaft 41 rests in a bearing 42 and has a bearing lining 47 surrounding the lower end thereof. To achieve protection from the outside liquids, I have set the sleeve 45 into the bearing lining within a waterproof fit. The bearing lining sits in the cup-shaped bearing housing 46 having a flange 48 around the top thereof which is bolted to the bottom of the casing. Fixed to hub 44 around the shaft or to the shaft itself, is a bell-shaped hood 43 which has the function as set forth hereinabove. In this case, however, the hood is shown composed of several parts which are bolted or otherwise fastened together in a readily demountable manner to provide an air-tight hood. In view of the similarity of construction, the operation of these modified embodiments will be readily understood by those skilled in the art without any further explanation.

In the modified embodiment shown in Fig. 4, a bearing housing 62 having an integrally formed sleeve is provided and is secured in conventional manner to the bottom surface 60 of a tank or reservoir by means of studs 63. A packing 61 is interposed between the bearing housing and the bottom surface of the tank to prevent leakage. While in this specific embodiment a thrust bearing is shown having a button plate 64 and a bushing 65, clearly any other type of annular or roller bearing could be employed. A shaft 66 is rotatably supported by the bearing and is provided with a finely threaded portion 67 above the bearing surface. To this threaded portion is screwed a hood 68 provided with a corresponding thread and is forced against a sharp shoulder 69 on shaft 66 to make an air- and liquid-tight joint therewith. It will be noted from the drawings that the lower portion 70 of hood 68 is substantially bell-shaped in order to provide a large volume. When the tank or container in which the bearing is mounted is filled with a liquid, it has to enter the annular space between the inner surface of hood 68 and the outer surface of sleeve 71 at the bottom line 72 of the hood so that the air in the hood is trapped and cannot escape. The rising liquid compresses the air trapped in the annular space but as the upper portion or neck 79 of hood 68 is greatly contracted and is as close to the upper edge of sleeve 71 as this is practically permissible, the remaining air-filled space becomes so small that the liquid will never reach the top of the sleeve. In cases where such bearings are located at the bottom of very high containers, the hood has to be of correspondingly greater height and diameter. The remaining space in which the air is compressed is in the same proportion to the volume under the hood occupied by the liquid as the atmospheric pressure and the pressure at the surface level of the hood after the tank has been filled. In addition to this, part of the dead space will be filled out by the lubricants which will further increase the factor of safety. A tube 73 closed by cap 74 is connected by an elbow 75 to a nipple 76. Nipple 76 fits into a hole or boring 77 leading through center opening 78 to the bearing and shaft surfaces and permits the introduction of lubricants.

Fig. 5 illustrates a slight modification of the bearing depicted in Fig. 4. Same as in the bearing shown in Fig. 4, a bearing housing 82 is mounted to the bottom surface 80 of a tank by means of studs or bolts 83 and is separated from the bottom surface by a packing 81. A button plate 84 and a bushing 85 are provided within the bearing housing. A shaft 86 is provided with a threaded portion above the lower end thereof and carries an internally and externally threaded ring 87 which is forced against shoulder 89 of shaft 86 to provide a tight fit. Ring 87 carries a hood 88 screwed from the top onto the ring. Holes 90 in ring 87 are provided for the purpose of being engaged by a suitable tool when the ring is tightened on the shaft and also for the purpose of lubrication when the hood is removed. It will be noted that otherwise the bearing is of the same construction as the one shown in Fig. 4. Bolts 83 are provided under hood 88, which has a sharp shoulder 91 pressing against ring 87 to provide an air and liquid-tight seal therewith. Radially extending fins or blades 92 on hood 88 prevent the formation of dead spaces near the bearing as hood and shaft rotate together.

In Fig. 6 a further modification of my invention is shown. As in the other embodiments, a vertical shaft 100 is provided. A hood 101 is held by means of a threaded ring 102 pressing together packing ring 103 so that the hood may be tightly and permanently clamped to the shaft at any desired height. This permits to readily remove hood 101 for inspection of the bearing. Bearing 104 is secured by bolts to the outer bottom surface of a reservoir or tank and can be completely slipped out in a simple manner without disturbing any other part of the machine with which it is associated.

To reinforce bottom 105 of the tank and to give it a more secure fit, a reinforcing plate 106 is riveted to the bottom plate. Lubricants may be introduced into the bearing through a tube 107 indicated in dash and dotted lines and provided outside of the tank or reservoir. A valve 108 is provied in tube 107 for controlling the flow of lubricants. A horizontal tube 109 is connected by an elbow 110 and a nipple 111 to inlet opening 112 where the lubricants enter the bearing. Bushing 113 is of a character similar to the ones shown in Figs. 4 and 5.

When it is desired to introduce lubricants into the bearing, a small nipple 114 or union extending from valve 108 is connected to a pressure grease or oil gun (not shown). When the same is under a pressure equaling that exerted by the liquid on the air trapped and compressed under the hood, valve 108 is opened and the desired amount of lubricant is introduced into the bearing. Hereafter, the valve is closed again. It is also possible to employ permanent forced oil lubrication but care must be taken that no overflow should enter the tank, or else a line for return circulation must be installed.

The present application is a continuation in part of my co-pending application Serial No. 758,552, filed December 21, 1934, now Patent No. 2,082,796, which discloses my improved bearing in connection with an agitator for which the liquid-proof submerged bearings embodying the present invention are particularly adapted.

I claim:

1. In a submerged bearing structure protected against the influence of a liquid including a substantially vertical shaft and a bearing for supporting the lower end of said shaft, a seal structure for said bearing, said seal structure comprising a sleeve surrounding the terminal region of said shaft, and a hood air-tightly connected to said shaft and forming with said sleeve an annular chamber, said chamber being constructed and arranged to entrap air therein and to prevent access of a liquid to said bearing, the volume of said chamber being relatively large at the open end and diminishing rapidly to a minimum at the closed end.

2. In a submerged bearing structure protected against the influence of a liquid including a substantially vertical shaft and a bearing for supporting the lower end of said shaft, a seal structure for said bearing, said seal structure comprising a sleeve associated with said shaft and surrounding the terminal region thereof, and a bell-shaped hood air-tightly connected to said shaft and forming with said sleeve an upwardly closed annular chamber, said chamber having a very substantial width at the bottom thereof and a greatly constricted width in the upper portions thereof whereby air will be entrapped in said chamber by the inflowing liquid and will prevent access of said liquid to said bearing.

3. In a submerged bearing structure protected against the influence of a liquid including a substantially vertical shaft and a bearing for supporting the lower end of said shaft, a seal structure for said bearing, said seal structure comprising a cylindrical sleeve surrounding the terminal region of said shaft, a bell-shaped hood rigidly and air-tightly connected to said shaft and cooperating with said sleeve to form an upwardly constricting air trap therewith, said air trap having a relatively large volume at the open end thereof and a strongly constricted volume in proximity to the closed end thereof, and means for introducing a lubricant into said bearing against the prevailing pressure.

4. In a submerged bearing structure protected against the influence of a liquid including a substantially vertical shaft and a bearing for supporting the lower end of said shaft, a seal structure for said bearing, said seal structure comprising a cylindrical sleeve surrounding the terminal region of said shaft, a bell-shaped hood removably mounted on said shaft and forming an air-tight seal therewith cooperating with said sleeve to form an upwardly constricting air trap having a relatively large volume at the open end and a strongly constricted volume in proximity to the closed end thereof, and a normally closed port in said bearing for the introduction of lubricants into said bearing against the pressure prevailing therein.

5. In a submerged bearing structure for the bottom of a tank containing liquid including a removable bearing housing protruding into the bottom portion of a tank and forming a liquid-tight seal therewith, a bearing in said housing, and a vertical shaft having its lower end resting in said bearing; a seal structure for said bearing, said seal structure comprising a cylindrical sleeve surrounding the terminal region of said shaft, and a bell-shaped hood air-tightly connected to said shaft and cooperating with said sleeve to form an upwardly constricting air trap therewith, said air trap having a relatively large volume at the open end and a strongly constricted volume in proximity to the closed end thereof, and said housing and said bearing therein being adapted to be readily removed without dismounting said shaft and its associated parts.

6. In a submerged bearing structure protected against the influence of a liquid including a vertical shaft and a bearing for the lower end thereof, a seal structure for said bearing, said seal structure comprising a cylindrical sleeve surrounding the terminal region of said shaft and forming a liquid-proof seal therewith, and a bell-shaped hood constituted of a plurality of segments airtightly connected to each other and to said shaft and cooperating with said sleeve to form an upwardly constricting air trap therewith, said air trap having a relatively large volume at the open end thereof and a strongly constricted volume in proximity to the closed end thereof, and pressure lubricating means associated with said bearing for introducing lubricants thereinto against the pressure in said bearing and in said air trap.

MORITZ GAERTNER.